United States Patent [19]

Diessner

[11] 4,251,681

[45] Feb. 17, 1981

[54] COMPRESSED GAS INSULATED HIGH VOLTAGE LINE

[75] Inventor: Armin Diessner, Berlin, Fed. Rep. of Germany

[73] Assignee: Siemens Aktiengesellschaft, Munich, Fed. Rep. of Germany

[21] Appl. No.: 973,677

[22] Filed: Dec. 27, 1978

[30] Foreign Application Priority Data

Jan. 12, 1978 [DE] Fed. Rep. of Germany ....... 2801505

[51] Int. Cl.² ............................................... H01B 9/04
[52] U.S. Cl. .................................. 174/28; 174/12 R; 174/16B
[58] Field of Search ............... 174/28, 29, 16 B, 12 R, 174/99 B

[56] References Cited

U.S. PATENT DOCUMENTS

| 2,874,207 | 2/1959 | Schymik | 174/12 R X |
| 3,585,270 | 6/1971 | Trump | 174/28 X |
| 3,739,074 | 6/1973 | Floessel | 174/28 |
| 4,110,551 | 8/1978 | Cookson | 174/28 X |

Primary Examiner—Arthur T. Grimley
Attorney, Agent, or Firm—Kenyon & Kenyon

[57] ABSTRACT

A compressed gas insulated high voltage line which has a metal encapsulation and supports the high voltage conductors on support insulators in which movability of the conductor in the axial direction relative to the encapsulation is provided by means of at least two parallel, sliding guidance pins extending parallel to the axis of the high voltage conductor and the encapsulation. The pins are connected to one end of the support insulator and provide longitudinal movability for accommodating length changes of the high voltage conductor relative to the encapsulation under thermal stress.

8 Claims, 5 Drawing Figures

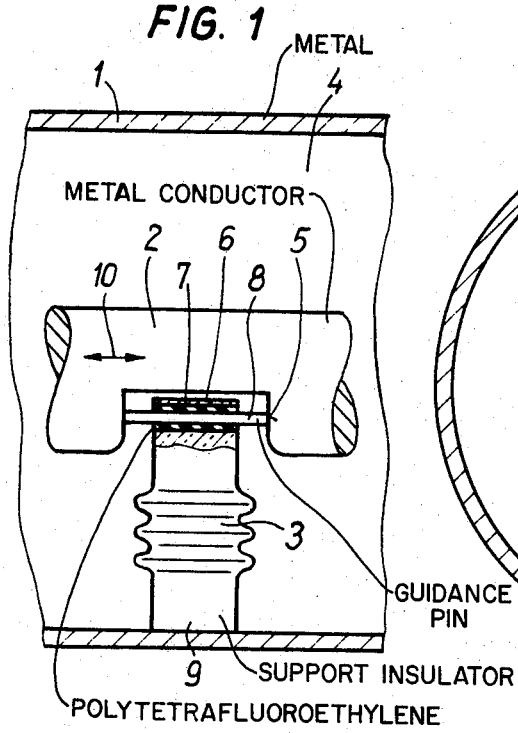
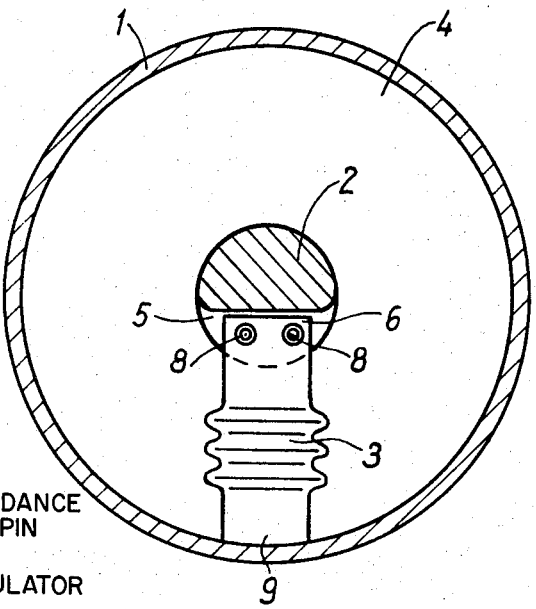
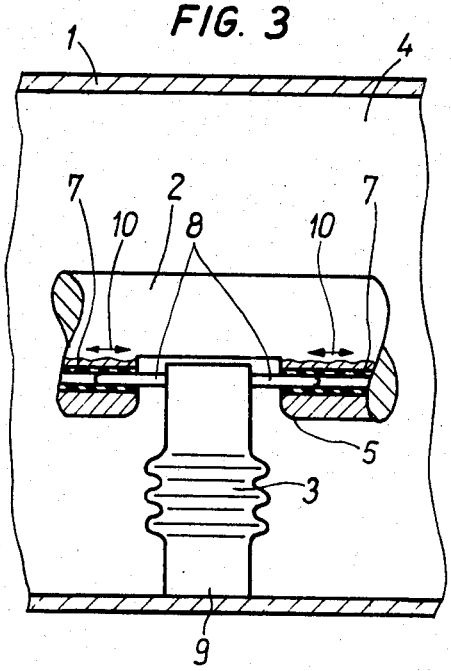

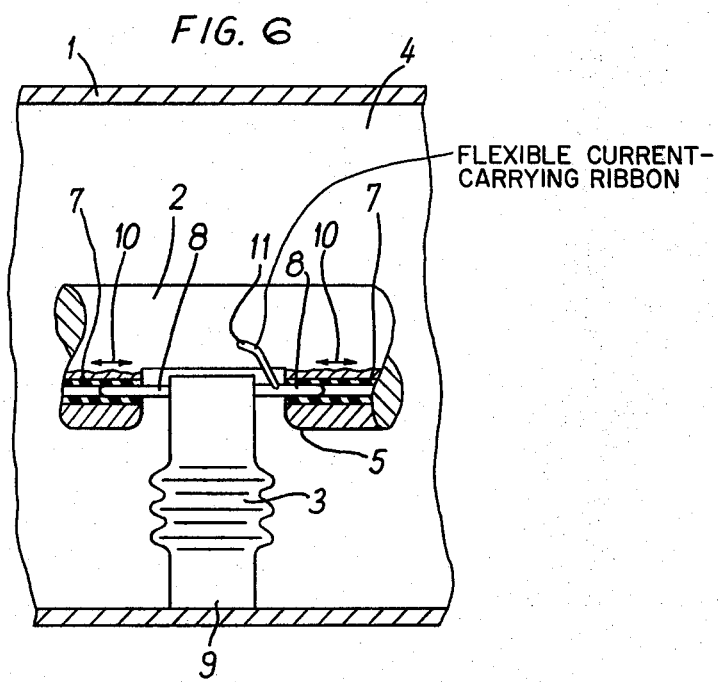

COMPRESSED GAS INSULATED HIGH VOLTAGE LINE

BACKGROUND OF THE INVENTION (a) Field of the Invention

This invention relates to a metal encapulated, compressed gas insulated, high voltage line and to high voltage carrying conductors supported therein by support insulators which are axially movable relative to the encapsulation.

(b) Description of the Prior Art

In German Offenlegungsschrift No. 23 47 003, an encapsulated tubular line is described in which the high voltage carrying conductors are supported inside a tubular metallic encapsulation by means of support insulators. There, a slide bearing is provided between the high voltage conductor and the control electrode of the support insulator, which effects, on the one hand, an equalization of tolerances and, on the other hand, equalizes different changes in length of the high voltage conductor and the encapsulation.

In German Pat. No. 20 48 989, a compressed gas insulated high voltage line is described in which the insulators are connected to an external metal mounting which is, in turn, made movable relative to the encapsulation by means of rollers. In that arrangement, different changes in length of the current carrying parts of the compressed gas insulated high voltage line in case of thermal stresses are equalized.

SUMMARY OF THE INVENTION

The present invention provides a different solution to the problem of obtaining a longitudinal movability of the high voltage conductor relative to the encapsulation in a compressed gas insulated high voltage line.

In accordance with the invention, at least two parallel sliding guidance pins are provided which extend parallel to the high voltage conductor and to the encapsulation and are connected to one end of the support insulator and are held at the high voltage conductor or the encapsulation.

Through the application of the invention, axial movability of the high voltage conductor is obtained by means of a guide which is rigid in the axial direction so that stresses due to current flow do not lead to a yielding movement of the conductor. A feature of the invention is the use of cylindrical support insulators instead of the disc shaped or hollow conical support insulators heretofore used.

While an encapsulated gas insulated high voltage line having cylindrical support insulators for the high voltage conductor is shown in German Offenlegungsschrift No. 23 30 282 where they are disposed for motion relative to the encapsulation by means of rollers, the arrangement for the displacement does not act directly between the encapsulation, the support insulator and the high voltage conductor, but, rather, between tracks and a carrier for the support insulators which is equipped with rollers.

In one particularly advantageous embodiment of the structure taught in the present invention, the sliding guidance pins are rigidly fastened to the support insulator. Thus, the guidance pins may be cast into the support insulator. In a somewhat different embodiment, the sliding guidance pins are movably supported at the support insulator. In all cases, the sliding guidance pins are guided in slide bearings made of a material leaving a small friction coefficient. Polytetrafluoroethylene can be used as the sliding material, the conductivity being increased by an electrically conductive additive such as graphite. In this way, the slide bearing is shorted and made electrically conducting. It is also possible to provide the electrically conducting short by means of a flexible current carrying ribbon.

BRIEF DESCRIPTION OF THE DRAWINGS

FIG. 1 is a slide view in cross section of a portion of a compressed gas insulated high voltage line fabricated in accordance with the teachings of the invention.

FIG. 2 is an end view of the structure of FIG. 1.

FIG. 3 is a side view in cross section of an alternative of the structure of FIG. 1.

FIG. 6 is a side view, in cross-section, of alternate structure to that of FIG. 3.

DETAILED DESCRIPTION OF THE INVENTION

Figure 4:
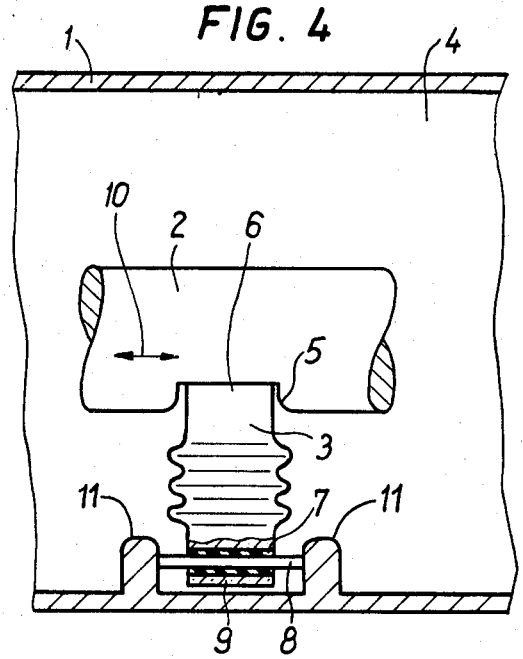
FIG. 4 is a side view in cross section of another embodiment of the invention, showing sliding guidance at the foot of the support insulator.

The compressed gas insulated high voltage line shown in FIGS. 1 and 2 comprises a metal encapsulation 1 and a conductor 2 which carries high voltage and is supported by means of support insulators 3. The interior 4 of the encapsulation 1 is filled with a gaseous insulating medium, e.g., sulfur hexafluoride, at a pressure of about 3 bar. The conductor 2 has a recess or constriction 5 at the fastening point of the support insulator into which one end 6 of the support insulator 3 projects. The end 6 of the support insulator 3 is equipped with slide bearings 7 which cooperate with sliding guidance pins 8. Pairs of sliding guidance pins 8 are employed at each fastening point to provide lateral support for conductor 2. As is more clearly seen in FIG. 2, the sliding guidance pins 8 are parallel to each other, to the high voltage conductor 2, and to the encapsulation 1. The other end 9 of the support insulator 3 is rigidly connected to the encapsulation 1.

Thus, high voltage conductor 2 can move longitudinally in the direction of the arrow 10 relative to the encapsulation 1 in case of expansion or contraction due to thermal stress.

In the embodiment example of FIG. 3 where like parts have the same reference symbols as in FIG. 1, the sliding guidance pins 8 are rigidly fastened to the support insulator 3. In this case, the sliding guidance pins 8 are received in slide bearings 7 mounted rigidly in conductor 2; a guide is again provided for sliding motion of high voltage conductor 2 relative to the encapsulation 1.

The embodiment of FIG. 4 shows the use of a pair of sliding guidance pins 8 rigidly fastened to encapsulation 1 by means of supports 11. In this case, the guidance pins cooperate with bushings 7 which are rigidly anchored in the support insulator 3 and which serve as slide bearings. The inner end 6 of support insulator 3 is rigidly anchored in the constriction 5 of the high voltage conductor 2. Thus, the outer end 9 of the insulator is slidably supported adjacent to the wall of encapsulation 1.

Figure 5:
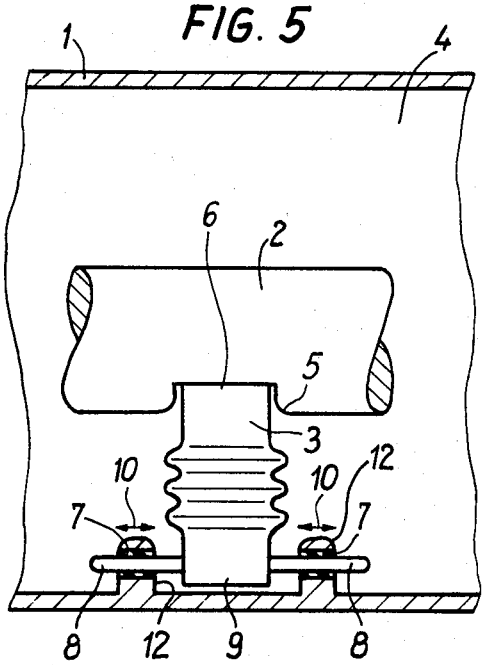
FIG. 5 is an alternative embodiment of the structure of FIG. 4.

FIG. 5 shows slide bearings 7 which are connected to the encapsulation 1 by means of inward projecting supports 12; sliding guidance pins 8 are rigidly anchored in the outer end 9 of the support insulator 3 and are slidably received in bearings 7. In this way, the same action as with the arrangement of FIG. 4 is obtained.

In all cases, sliding guidance pins 8 are arranged in parallel and are guided in slide bearings 7 made of a material having a low coefficient of friction. Polytetrafluoroethylene containing an electrically conductive additive such as graphite is preferred as the slide bearing material. With the increased conductivity so provided, the transfer of potential to the arrangement for the longitudinal movement of the conductor 2 is assured.

It is also possible to effect the electrically conducting bypass of the bearing arrangement by a flexible current-carrying ribbon. FIG. 6 illustrates the manner in which flexible current carrying ribbon 11 may be fastened between the conductor 2 and the sliding guidance pin 8 of the structure of FIG. 3 to bypass the bearing arrangement.

What is claimed is:

1. A compressed gas insulated high voltage line having a metal encapsulation and a high voltage carrying conductor carried on a support insulator and axially movable relative to the encapsulation, wherein the improvement comprises one end of the support insulator being mounted for sliding movement parallel to the high voltage conductor and the encapsulation by means of two guidance pins.

2. A high voltage line in accordance with claim 1 in which the guidance pins are rigidly fastened to the support insulator.

3. A high voltage line in accordance with claim 1 in which the guidance pins are guided slidably at the support insulator.

4. A high voltage line in accordance with one of the claims 1 to 3 in which the guidance pins are movably guided in slide bearings comprising a material having a small friction coefficient.

5. A high voltage line in accordance with claim 4, in which the slide bearing material is polytetrafluoroethylene.

6. A high voltage line according to claim 4 characterized by the feature that the slide bearings are shorted in an electrically conducting manner.

7. A high voltage line in accordance with claim 6 in which the electrically conducting short comprises a flexible current carrying ribbon.

8. A high voltage line in accordance with claim 5 in which the polytetrafluoroethylene contains an electrically conductive additive for increasing the conductivity of the slide bearing material.

* * * * *